UNITED STATES PATENT OFFICE.

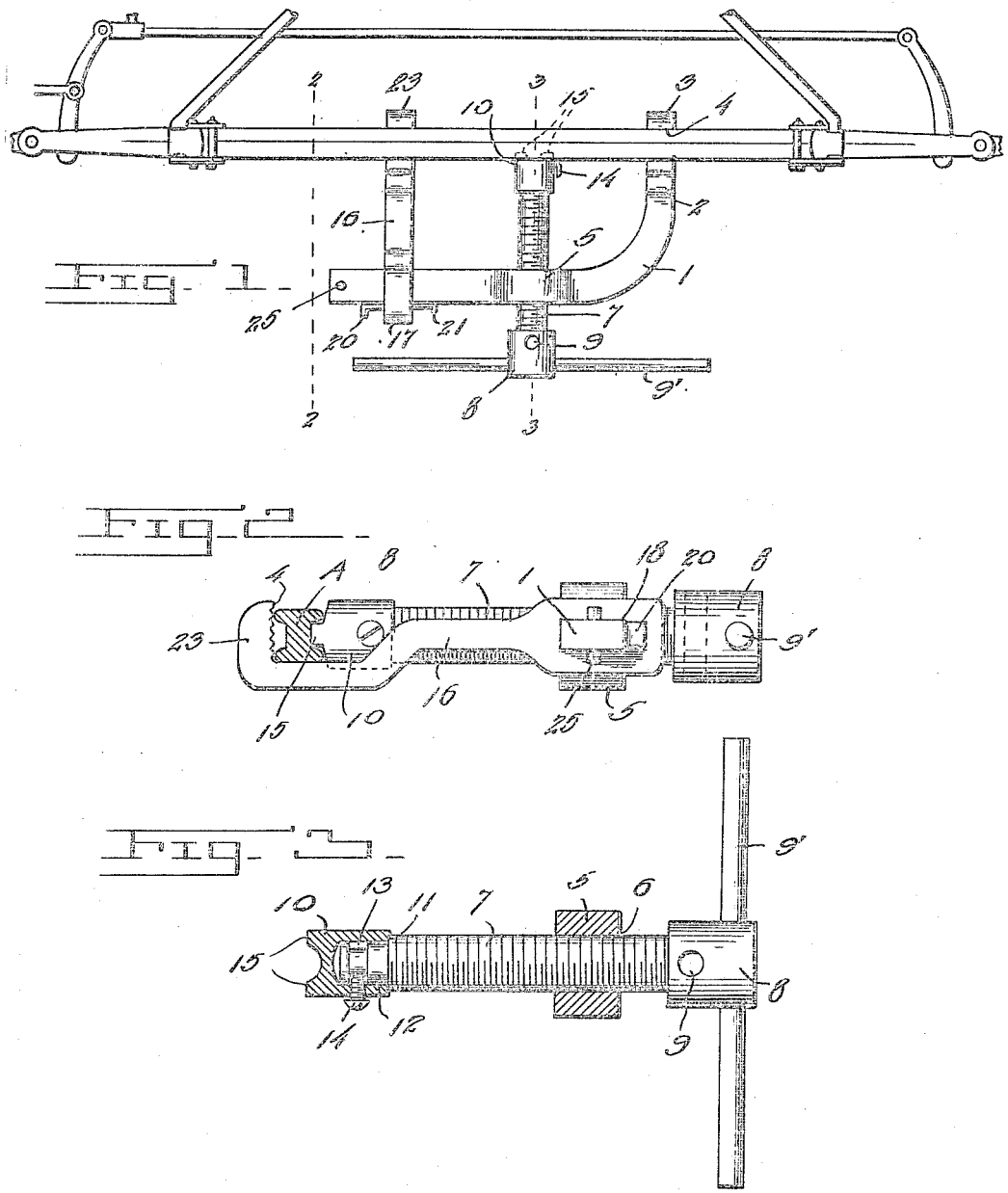

ADAM B. TALLMAN, OF SHELBYVILLE, ILLINOIS.

AXLE-STRAIGHTENING DEVICE.

1,319,434.     Specification of Letters Patent.     Patented Oct. 21, 1919.

Application filed February 5, 1919. Serial No. 275,157.

*To all whom it may concern:*

Be it known that I, ADAM B. TALLMAN, a citizen of the United States, residing at Shelbyville, in the county of Shelby and State of Illinois, have invented certain new and useful Improvements in Axle-Straightening Devices, of which the following is a specification.

This invention relates to improvements in straightening devices and more particularly to devices for straightening vehicle axles, shafts, rails and the like.

The main object of the invention is to provide a device of this character which may be employed for straightening a cold axle without removing it from the vehicle of which it forms a part.

Another object is to provide a simple, easily operated, and effective device of this character which is adjustable to adapt it for use on long or short axles and to provide for the positioning of the force exerting member closer to or further away from the axle support.

In the accompanying drawings—

Figure 1 represents a plan view of an axle straightener constructed in accordance with this invention shown applied to an automobile axle.

Fig. 2 is an end elevation thereof with the axle shown in section taken on line 2—2 of Fig. 1.

Fig. 3 is a sectional view of the tool taken in a position at right angles to that shown in Fig. 2.

The straightening device embodying this invention comprises a substantially L-shaped bar 1 the short arm 2 of which has its free end offset laterally and provided with a laterally extended foot 3 having its inner face serrated as shown at 4, to provide an effective gripping face for holding the axle A or other rod to be straightened as will be presently more fully described.

The L-shaped bar 1 is preferably composed of wrought iron or any other suitable metal and has a boss 5 arranged intermediate its ends with a threaded opening 6 extending edgewise therethrough to receive a force-applying screw 7 the upper end of which has a head 8 provided with transversely extending bores 9 to receive a rod 9′ for turning the screw to cause a bearing block 10 swiveled on its lower end to forcibly engage the axle A to be straightened. This bearing block 10 has a socket 11 in its inner face or end to receive the reduced inner end 12 of the screw 7, said end 12 having an annular channel 13 formed therein for the reception of a set screw 14 which latter extends transversely through one wall of the socket 11 and enters the channel 13 thereby swiveling the block 10 to the screw as is shown clearly in Fig. 3. This block 10 has its article engaging face bifurcated the furcations 15 of which are designed to enter the space between the flanges of the axle A, which is here shown in the form of an I-beam, or they may straddle the object to be straightened whereby the screw is held seated on said axle or other object as is shown clearly in Figs. 1 and 2.

An arm 16 is slidably mounted on the bar 1 on the side of the boss opposite to that which carries the arm 2. This arm 16 has an enlarged head 17 with an aperture 18 extending therethrough and corresponding in configuration to the cross-sectional contour of said bar 1 on which it slides, and this bar being angular in cross-section the arm is thereby held against turning on said bar. The aperture 18 is made sufficiently large to permit the insertion therein, between one wall thereof and the bar 1, of a wedge-shaped locking key which bindingly connects the arm 16 to the bar 1 in any desired adjusted position.

The key is preferably constructed as shown in Fig. 1 having outturned laterally extending ends 20 and 21 the end 20 being in the form of a finger which is designed to be used in inserting the key in locked position and for withdrawing it, the end 21 operating as a stop to prevent the withdrawal of the key and to prevent loss thereof.

The arm 16 has its free end offset laterally similar to that of arm 2 and is provided at its terminal with a laterally extending foot 23 which projects in the same direction as the foot 3 of the arm 2 and has its upper face serrated similar to said foot 3. This foot 23 is arranged in longitudinal alinement with foot 3, the arm 16 being of a length substantially the same as that of arm 2 to properly position its axle supporting foot in alinement with foot 3.

In the use of this device when it is desired to straighten the axle, screw 7 is moved outwardly by inserting a suitable tool in one of the bores 9 of the head thereof and turning the same in the proper direction to withdraw it. The feet 3 and 23 are then engaged with the axle to be straightened, the device being positioned on the axle according to the bent portion thereof either at the top thereof, at the side or underneath according to the direction in which it is desired to exert force on the axle for straightening it. In the embodiment illustrated the device is shown applied to the side of an axle, the furcations 15 of the swiveled bearing block 10 on screw 7 being shown positioned between the upper and lower flanges of the axle on its outer face and the feet 3 and 23 engaged with its inner face whereby the axle is securely clamped between the three points mentioned, the arm 16 having been first adjusted on bar 1 according to the point at which it is desired the foot 23 thereof to engage the axle. The screw 7 is then moved toward the axle A by turning the rod 9′ which is engaged with the bore 9 thereof to cause said screw to move forwardly through the threaded aperture in the boss 5. This forward movement of the screw exerts force against the axle at the point desired to be straightened and is continued to be moved in this direction until the axle has been straightened to the desired extent.

The threads of the screw 7 are preferably made comparatively fine so that a gentle forcing of the screw outward will be effected by the turning of said screw in the threaded boss 5 and thereby prevent danger of breaking the axle which would be likely if the straightening force were quickly applied.

A pin 25 extends transversely through the free outer end of bar 1 and is designed to form a stop for limiting the outward movement of said arm 16 to prevent its disengagement from the bar and its consequent loss.

From the foregoing description, taken in connection with the accompanying drawing, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:

A straightening device of the class described comprising a substantially L-shaped bar, the short arm of which has its free end offset laterally facewise in one direction and provided at its terminal with a foot extending laterally in the opposite direction to said offset to position the foot in alinement with the body portion of the arm, another arm mounted to slide on the long arm of said L-shaped bar with its free end offset laterally in the same direction as the offset of the other arm and having a foot extending laterally from its terminal in the opposite direction to the offset thereof, wedging means for locking said movable arm in adjusted position on said bar, a screw extending edgewise through and having threaded engagement with said bar between the feet carrying arms thereof, a bearing block swiveled on said screw and having furcations at its outer end for engaging an axle to be straightened, said block engaging the axle on one face and the feet of said arms engaging it on the diametrically opposite face, and means for rotating said screw.

In testimony whereof I affix my signature in presence of two witnesses.

ADAM B. TALLMAN.

Witnesses:
C. E. BEEM,
L. R. TALLMAN.